United States Patent
Ishida (10) Patent No.: US 8,059,618 B2
(45) Date of Patent: Nov. 15, 2011

(54) PORTABLE INFORMATION DEVICE

(75) Inventor: Masaaki Ishida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 823 days.

(21) Appl. No.: 12/013,847

(22) Filed: Jan. 14, 2008

(65) Prior Publication Data

US 2008/0170534 A1    Jul. 17, 2008

(30) Foreign Application Priority Data

Jan. 16, 2007   (JP) .............................. P2007-007097

(51) Int. Cl.
*H04J 3/00*   (2006.01)
(52) U.S. Cl. ...................................... 370/337; 455/347
(58) Field of Classification Search ........................ None
See application file for complete search history.

(56) References Cited

U.S. PATENT DOCUMENTS

| | | | | |
|---|---|---|---|---|
| 5,815,821 | A * | 9/1998 | Pettersson ..................... | 455/574 |
| 5,867,131 | A * | 2/1999 | Camp et al. .................... | 343/797 |
| 2001/0043583 | A1* | 11/2001 | Sakoda et al. ................. | 370/337 |
| 2003/0124985 | A1* | 7/2003 | Shin et al. ...................... | 455/82 |
| 2004/0232993 | A1* | 11/2004 | Yeh ................................. | 330/295 |
| 2005/0281210 | A1* | 12/2005 | Makino ......................... | 370/275 |
| 2008/0055173 | A1* | 3/2008 | Chominski ..................... | 343/741 |
| 2009/0231208 | A1* | 9/2009 | Egawa et al. .................. | 343/702 |

FOREIGN PATENT DOCUMENTS

| | | |
|---|---|---|
| JP | 2002-033714 | 1/2002 |
| JP | 2004-147004 | 5/2004 |
| JP | 2006-33076 | 2/2006 |
| JP | 2006-186865 | 7/2006 |

OTHER PUBLICATIONS

Office Action issued Apr. 11, 2011, in Japanese Patent Application No. 2007-007097 (with English Translation).

* cited by examiner

*Primary Examiner* — Bunjob Jaroenchonwanit
(74) *Attorney, Agent, or Firm* — Oblon, Spivak, McClelland, Maier & Neustadt, L.L.P.

(57) ABSTRACT

A portable information device includes first and second enclosures and a hinge portion connecting those enclosures. The first enclosure has: an antenna; a plurality of active circuits for predetermined frequency bands; a first circuit that demultiplexes reception signals into input signals with the predetermined frequency bands to output the input signals to the active circuits and multiplexes output signals with the predetermined frequency bands to output the multiplexed output signals as transmission signals to the antenna; and a second circuit that multiplexes the input signals and demultiplexes transmission signals into the output signals to output the output signals to the active circuits. The second enclosure has: wireless systems; and a third circuit that demultiplexes the multiplexed input signals as the reception signals from the second circuit into input signals with the predetermined frequency bands to output the input signals to the wireless systems and multiplexes output signals with the predetermined frequency bands from the wireless systems to output the multiplexed output signals as the transmission signals to the second circuit.

6 Claims, 5 Drawing Sheets

PORTABLE INFORMATION DEVICE

BACKGROUND OF THE INVENTION

1. Field of the Invention

The present invention relates to a portable information device to transmit and receive plural kinds of wireless signals.

2. Description of the Related Art

With the rapid development of communication technologies a wireless system becomes explosively widespread, which is utilized for portable information devices such as a notebook computer and a cellular phone. As typical examples of such a wireless system, there are given: a local area network technology, MIMO (Multiple Input Multiple Output), for transmitting and receiving data with a plurality of antennas; Bluetooth for communicating between information devices; metropolitan area network technologies, IEEE802.16/IEEE802.16/IEEE802.20, for covering the area of about 50 km in radius with a single antenna using a frequency band of 2-66 GHz; and UWB (Ultra Wide Band) for transmitting and receiving signals with an extremely wide frequency band with about 1 GHz.

When a wireless system is mounted on a notebook computer as an example of a mobile device, an antenna of the wireless system is arranged at an upper portion of a display of the notebook computer to easily receive radio waves and a transmitting and receiving circuit of the wireless system is arranged in a main body of the notebook computer. This arrangement makes a path (mainly a cable) long, which connects the antenna and the transmitting and receiving circuit. Since such a long cable serves as a low-pass filter (LPF), the cable attenuates a high frequency signal with a gigahertz frequency band, which is expected to be used in portable information devices. Thus, the carrier to noise ratio (CN ratio) of reception signals becomes small and a noise figure (NF) becomes worse in the main body. Here the noise figure is an index that shows the ratio of 'the CN ratio of an input signal' to 'the CN ratio of an output signal'.

Japanese Patent Publication Laid-open No. 2006-33076 employs a technique, called "an active antenna", that provides a reception line and a transmission line near an antenna and arranges an amplifier on the reception line for suppressing the NF degradation.

Figure 1:
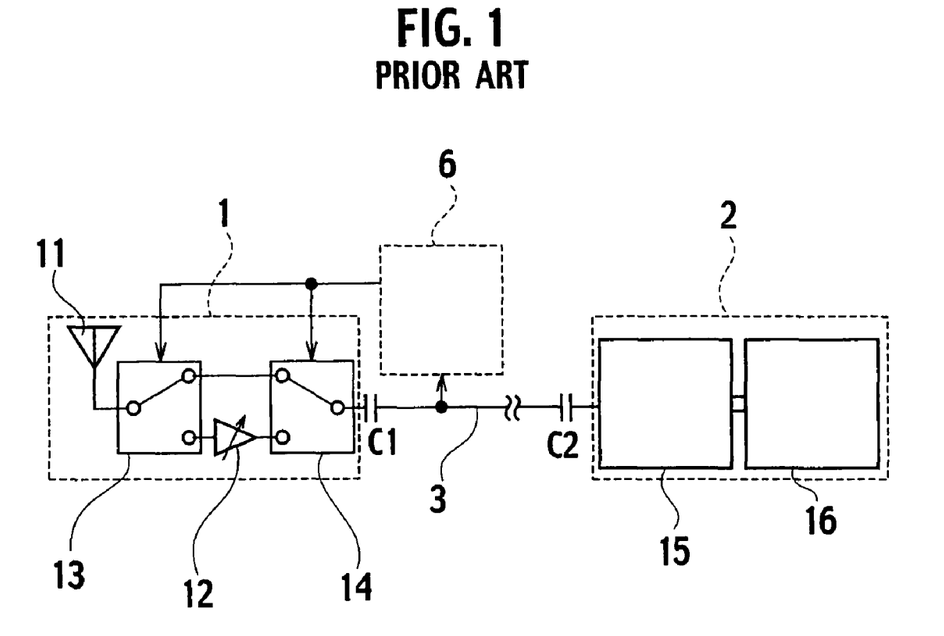
FIG. 1 shows a schematic configuration of a conventional wireless system.

FIG. 1 shows a schematic configuration of a wireless device recited in the above patent document. The wireless device comprises an active antenna 1, a transmitting and receiving device 2, a signal line 3 that connects the active antenna 1 and the transmitting and receiving device 2, and a transmission control signal detecting unit 6. When a signal is transmitted, the transmission control signal detecting unit 6 generates a control voltage for switches 13, 14 using transmission power on the signal line 3. When a signal is received, an amplifier 12 is activated and the switches 13, 14 are controlled using a voltage superimposed in the signal on the signal line 3. This wireless device allows us to use only a single signal line for both of reception and transmission.

With the active antenna 1, the amplifier 12 amplifies a signal received with an antenna 11 before attenuated by passing through the signal line 3. Accordingly, even though the received signal attenuates through the signal line 3, the reduction of the CN ratio can be suppressed and consequently the degradation of the NF of the wireless device can be prevented.

SUMMARY OF THE INVENTION

The above-described wireless systems, however, have different purposes and application ranges, respectively. Thus, there is a strong demand for a mobile device that mounts a plurality of wireless systems and use them at the same time, so-called "a multi-wireless system".

When a multi-wireless system composed of a plurality of wireless systems is mounted on a notebook computer, a plurality of antennas should be arranged on an upper portion of a display of the notebook computer from the viewpoint of receiving sensitivity. Each antenna is specialized for the respective wireless systems in order to utilize the plurality of wireless systems. However, the mounting space is quite limited and it is difficult to individually install the plurality of antennas. Thus, it has been recently sought a technique to share a single wideband antenna with a plurality of wireless systems using a time division duplex (TDD) method. Since the TDD method performs a high-speed switching of transmission and reception, a multi-wireless system using the TDD method can connect signals from the plurality of wireless systems to a single antenna through a single cable. However, here remains an essential issue; the reception and transmission for the plurality of wireless systems cannot be performed at the same time.

Moreover, in a circuit that has discontinuous characteristic impedance due to connection between two lines, a signal reflects at a connected portion and thus the CN ratio deteriorates significantly with a high possibility.

Also, even though a plurality of antennas can be individually installed in a notebook computer, the plurality of antennas are mounted on an upper portion of a display of the notebook computer and the respective wireless systems are mounted on a main body of the notebook computer. Thus, cables connecting the plurality of antennas and the respective wireless systems must pass through a hinge portion that foldably connects the main body and the display. Since the hinge portion is narrow, the mounting space is small. The cables should be therefore thinner and fewer and some of them should be bundled in the main body. Thus, to individually wire cables needs a large mounting space and limits the movement of the hinge portion, and consequently the notebook computer has few flexibility in design.

Mounting a plurality of wireless systems is also desired in a cellular phone to improve the convenience of daily life. In a cellular phone, there are many wireless solutions which are incompatible with each other. The cellular phone thus has the same issues as well as a notebook computer, that is, the mounting space of an antenna is limited and a hinge portion connects a display and a main body.

To address the above issues, the present invention provides a portable information device equipped with a multi wireless system that can realize a wireless communication with a high CN ratio and the minimum number of antennas.

According to a main aspect of the present invention, there is provided a portable information device comprises: a first enclosure including: an antenna that receives and transmits signals; a first circuit connected to the antenna; a plurality of active circuits connected to the first circuit, each of which processes signals with a predetermined frequency band; and a second circuit connected to the plurality of active circuits; a second enclosure including: a third circuit connected to the second circuit; and a plurality of wireless communication control units connected to the third circuit, each of which processes signals with the respective predetermined frequency bands; and a connection portion that connects the first enclosure and the second enclosure, wherein the first circuit demultiplexes reception signals from the antenna into input signals with the predetermined frequency bands to output the input signals to the plurality of active circuits and multiplexes output signals with the predetermined frequency bands from the plurality of active circuits to output the multiplexed output signals as transmission signals to the antenna, wherein each of the plurality of active circuits includes an amplifier that amplifies each of the input signals; and a switch that selects either a reception line that outputs each of the input signals to the second circuit through the amplifier or a transmission line that outputs signals to the antenna, wherein the second circuit multiplexes the input signals from the plurality of active circuits to output the multiplexed input signals as the reception signals to the third circuit and demultiplexes signals from the third circuit as the transmission signals into the respective frequency bands to output the multiplexed signals as the output signals to the plurality of active circuits; wherein the third circuit demultiplexes the reception signals from the second circuit into input signals with the respective frequency bands to output the input signals to the plurality of wireless communication control units and multiplexes output signals from the plurality of wireless communication control units to output the multiplexed output signals as the transmission signals to the second circuit, and wherein each of the plurality of wireless communication control units performs at least one of modulation and demodulation of the respective input signals and the respective output signals using a carrier wave with a predetermined frequency band.

DETAILED DESCRIPTION OF THE PREFERRED EMBODIMENTS

There will be explained a portable information device according to some embodiments of the present invention in detail with reference to the figures.

Figure 2:
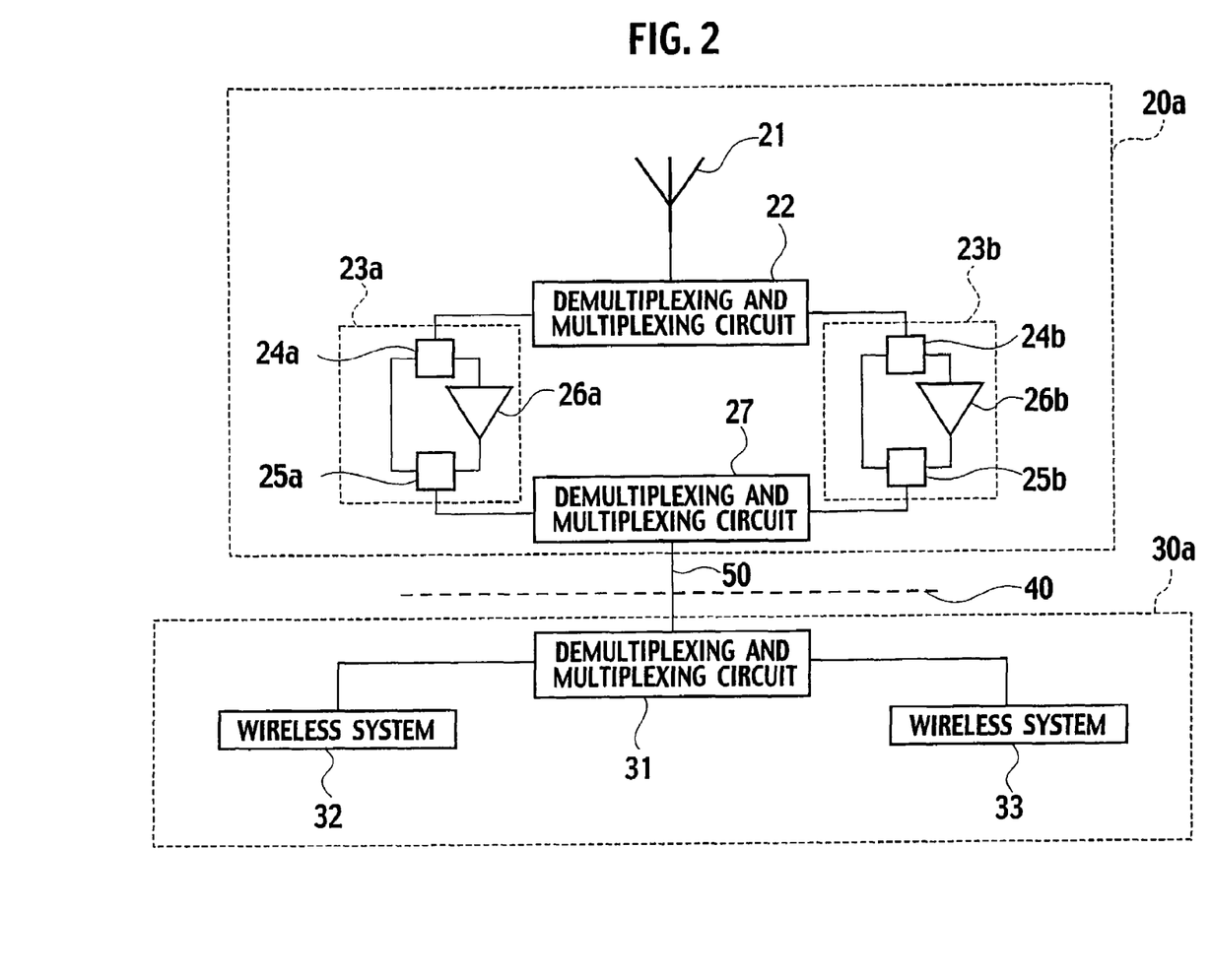
FIG. 2 shows a configuration of a portable information device according to an embodiment of the present invention.

FIG. 2 shows a configuration of a portable information device according to an embodiment of the present invention. The portable information device comprises an antenna device 20a, a transmitting and receiving device 30a, and a cable 50. The antenna device 20a and the transmitting and receiving device 30a are connected by a hinge portion 40.

The antenna device 20a (the first enclosure of the present invention) comprises an antenna 21, demultiplexing and multiplexing circuits 22, 27 and active circuits 23a, 23b.

In the present embodiment, the antenna 21 is a wideband antenna capable of transmitting and receiving signals having frequency bands within the range of 2.4-4.8 GHz. The active circuits 23a, 23b are provided to process signals with predetermined frequency bands, respectively. Concretely, the active circuit 23a is provided to process signals with the frequency band of 2.4-2.5 GHz and the active circuit 23b is provided to process signals with the frequency band of 3.1-4.8 GHz.

The active circuit 23a comprises an amplifier 26a and switches 24a, 25a. The amplifier 26a amplifies one of reception signals, which are received by the antenna 21 and demultiplexed by the demultiplexing and multiplexing circuit 22. The switches 24a, 25a select either a transmission path to transmit transmission signals to the antenna 21 or a reception path to receive reception signals through the amplifier 26a.

Similarly, the active circuit 23b comprises an amplifier 26b and switches 24b, 25b.

It is noted that the switches 24a, 25a and the switches 24b, 25b may be controlled by hand from outside, by the transmission control signal detection unit 6 explained in FIG. 1 as a conventional technique, or by a control unit 34 to be described later in an other embodiment. The switch 24a always works with the switch 25a to select either the transmission path or reception path. The same is true in the switches 24b, 25b.

The demultiplexing and multiplexing circuit 22 (the first demultiplexing and multiplexing circuit of the present invention) demultiplexes reception signals from the antenna 21 into input signals with the predetermined frequency bands to output the input signals to the active circuits 23a, 23b, and multiplexes output signals with the predetermined frequency bands from the active circuits 23a, 23b to output the multiplexed output signals as transmission signals to the antenna 21.

The demultiplexing and multiplexing circuit 27 (the second demultiplexing and multiplexing circuit of the present invention) multiplexes the input signals from the active circuits 23a, 23b to output the multiplexed input signals as the reception signals to the demultiplexing and multiplexing circuit 31, and demultiplexes signals from the demultiplexing and multiplexing circuit 31 to output the demultiplexed signals as the output signals to the active circuits 23a, 23b.

The transmitting and receiving device 30a (the second enclosure of the present invention) comprises wireless systems 32, 33, and a demultiplexing and multiplexing circuit 31.

The wireless systems 32, 33 (the wireless communication control units of the present invention) are provided to process signals with predetermined frequency bands and perform at least one of the modulation and demodulation of the signals using a carrier wave with a predetermined frequency band.

In the present embodiment, the wireless system 32 transmits and receives signals using the frequency band of 2.4-2.5 GHz. The wireless system 33 transmits and receives signals using the frequency band of 3.1-4.8 GHz.

The demultiplexing and multiplexing circuit 31 (the third demultiplexing and multiplexing circuit of the present invention) demultiplexes the reception signals from the demultiplexing and multiplexing circuit 27 into input signals with the predetermined frequency bands to output the input signals to the wireless systems 32, 33, and multiplexes output signals with the predetermined frequency bands from the wireless systems 32, 33 to output the multiplexed output signals as the transmission signals to the demultiplexing and multiplexing circuit 27.

Figure 3:
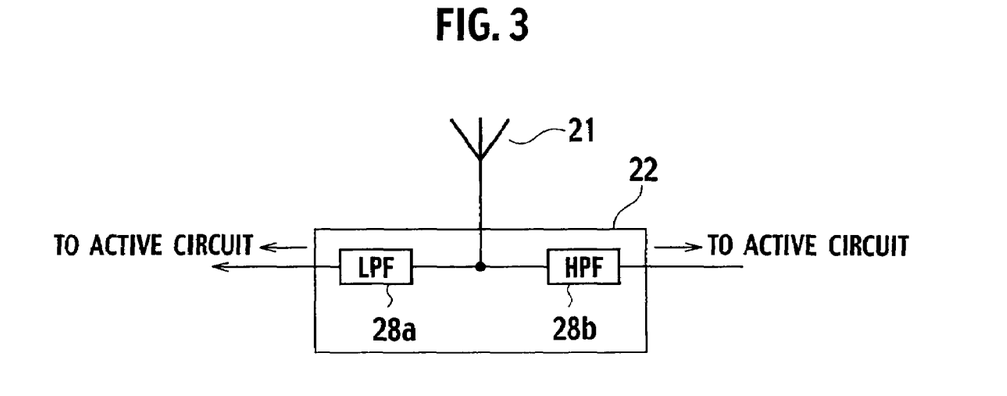
FIG. 3 shows a detailed configuration of a demultiplexing and multiplexing circuit of the portable information device according to the above embodiment.

FIG. 3 shows a detailed configuration of the demultiplexing and multiplexing circuit 22. The demultiplexing and multiplexing circuit 22 is comprised of a LPF 28a (Low Pass Filter) and a HPF 28b (High Pass Filter). One ends of the LPF 28a and HPF 28b are connected to the antenna 21, respectively. The other end of the LPF 28a is connected to the active circuit 23a and the other end of the HPF 28b is connected to the active circuit 23b. The LPF 28a is a filter to transmit signals with frequencies less than a cutoff frequency and attenuate signals with frequencies more or equal to the cutoff frequency. In the present embodiment, the cutoff frequency of the LPF 28a is 2.5 GHz. Accordingly, the LPF 28a transmits only signals for the wireless system 32 and does not transmit signals for the wireless system 33.

The HPF 28b is a filter to transmit signals with frequencies more or equal to a cutoff frequency and attenuate signals with frequencies less than the cutoff frequency. In the present embodiment, the cutoff frequency of the HPF 28b is 3.1 GHz. Accordingly, the HPF 28b transmits only signals for the wireless system 33 and does not transmit signals for the wireless system 32. When plural kinds of reception signals are input to the demultiplexing and multiplexing circuit 22 at the same time, the LPF 28a and HPF 28b can demultiplex the plural kinds of reception signals into input signals for the wireless system 32 and input signals for the wireless system 33 to transmit them to the respective wireless systems.

Figure 4:
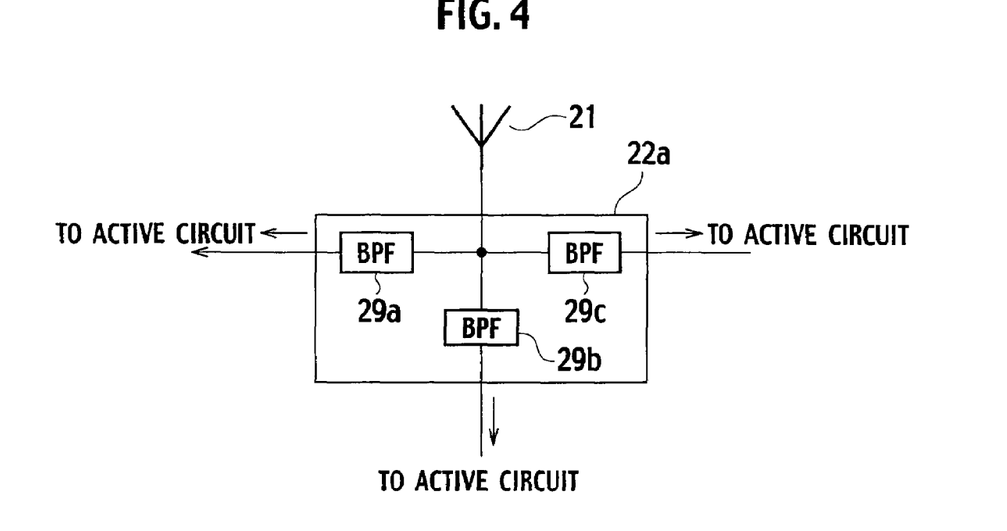
FIG. 4 shows an other example of the demultiplexing and multiplexing circuit of the portable information device.

It is noted that a demultiplexing and multiplexing circuit of the present invention is not always comprised of a LPF and a HPF. FIG. 4 shows an other example of the demultiplexing and multiplexing circuit of the present embodiment. The demultiplexing and multiplexing circuit 22a is comprised of a BPF 29a (Band Pass Filter), a BPF 29b and a BPF 29c. One ends of the BPF 29a, BPF 29b and BPF 29c are connected to the antenna 21, respectively, and the other ends are connected to different active circuits, respectively. In this case, three active circuits are required. In general, a BPF is a filter to pass only signals with certain frequency band and attenuate signals with the other frequency band. For example, the BPF 29a is a filter to pass signals with the frequency band of 1.5-1.8 GHz, the BPF 29b signals with the frequency band of 2.5-3 GHz, and the BPF 29c signals with the frequency band of 3.2-3.4 GHz. It is therefore possible to use three wireless systems for those frequency bands at the same time. In this case, a second enclosure can be provided with three wireless systems. It is noted that since a signal input to a demultiplexing and multiplexing circuit is transmitted through only a path for the frequency of the signal, there is almost no loss compared to distributors.

Similarly to the demultiplexing and multiplexing circuit 22, the demultiplexing and multiplexing circuits 27, 31 are comprised of a LPF and a HPF. One ends of the LPF and HPF of the demultiplexing and multiplexing circuit 27 are connected to the cable 50, respectively, and the other ends are connected to the active circuits 23a, 23b, respectively. One ends of the LPF and HPF of the demultiplexing and multiplexing circuit 31 are connected to the cable 50, respectively, and the other ends are connected to the wireless systems 32 and 33, respectively. When plural kinds of signals are input from the cable 50 at the same time, the demultiplexing and multiplexing circuit 31 therefore demultiplexes the plural kinds of signals into signals for the wireless system 32 and signals for the wireless system 33 to output them to the respective wireless systems.

The cable 50 is a coaxial cable that electrically connects the demultiplexing and multiplexing circuits 27, 31 through the inside of the hinge portion 40 to transfer plural kinds of reception signals and transmission signals with predetermined frequency bands.

Figure 5:
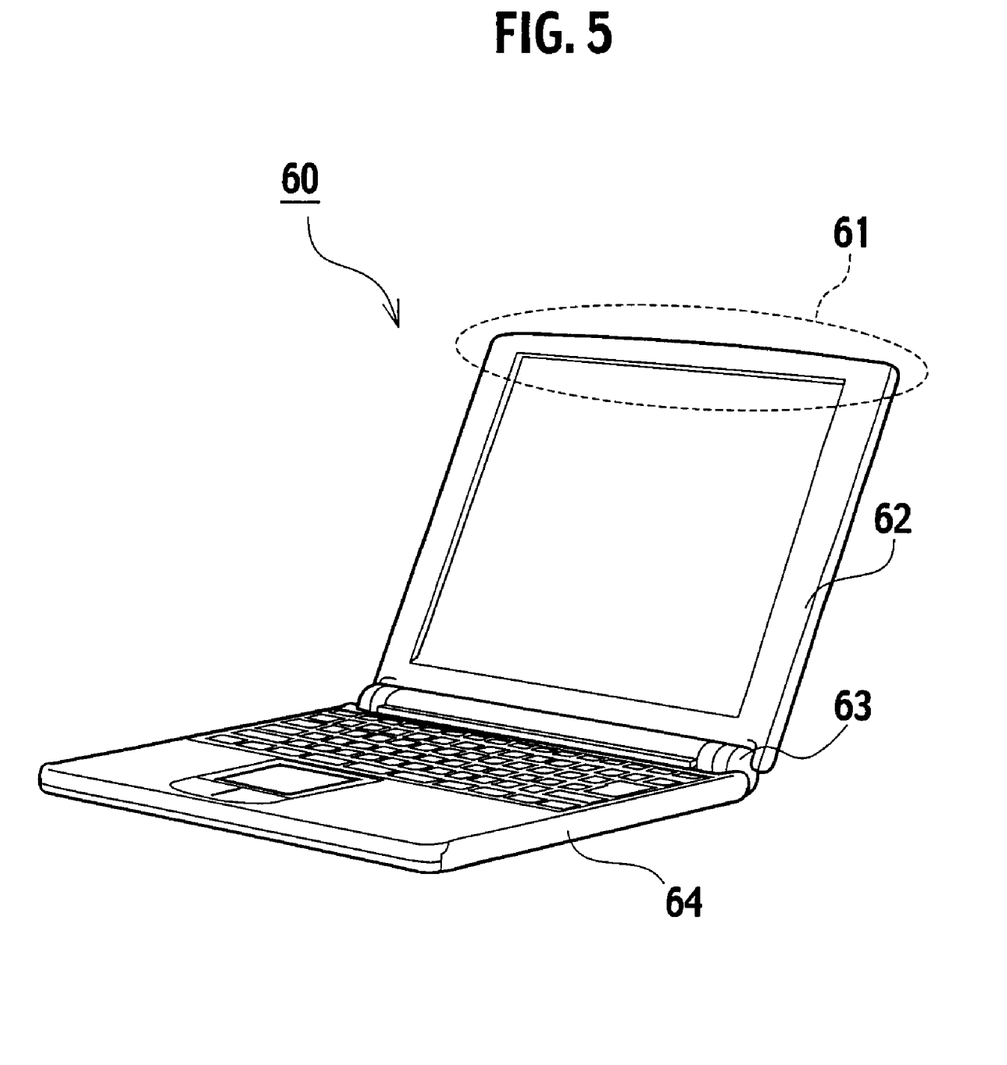
FIG. 5 shows a configuration of a common notebook computer.

FIG. 5 shows a configuration of a common notebook computer 60 to which a portable information device of the present embodiment is applied. The notebook computer 60 is constructed with a display unit 62, a hinge portion 63 and a main body 64.

In the present embodiment, the display unit 62 corresponds to the antenna device 20a (the first enclosure) in FIG. 2. The main body 64 corresponds to the transmitting and receiving device 30a (the second enclosure).

The main body 64 comprises a central processing unit (CPU) to compute data and create image data. The display unit 62 comprises a display to display images based on the image data created by the CPU. The display unit 62 and the main body 64 are connected by the hinge portion 63. The display unit 62 may be rotatably connected to the main body 64.

In such a common notebook computer 60, the antenna 21 of FIG. 2 is usually provided at a display upper portion 61. The wireless systems 32, 33 are provided inside the main body 64. Thus, the cable 50 cannot avoid to be passed through the inside of the hinge portion 63. Since the display upper portion 61 has a narrow installation space and thus interference between a plurality of antennas occurs, there is provided the antenna 21 which is a single wideband antenna to be shared by the plurality of wireless systems for different frequency bands.

Since each of the wireless systems 32 and 33 operates independently, there is a case in which the wireless system 32 receives reception signals while the wireless system 33 transmits transmission signals, or the opposite case. An active circuit to control a transmission path and a reception path is therefore necessary for each wireless system. Since reception signals received by the antenna 21 provided on the display upper portion 61 attenuates before inputted to the demultiplexing and multiplexing circuit 31 through the cable 50, the active circuits 23a, 23b to amplify the reception signals should be provided in the first enclosure (the display unit 62) as well as the antenna 21. Further, the cable 50, which is passed through the hinge portion 63, should be thinner and fewer. In the present embodiment, in order to transfer reception signals through the same signal path (that is, the cable 50), the reception signals are multiplexed by the demultiplexing and multiplexing circuit 27 and then demultiplexed by the demultiplexing and multiplexing circuit 31 to be output the demultiplexed reception signals to the respective wireless systems 32, 33 for the respective frequency bands. Transmission signals are transferred in the opposite way to reception signals.

In view of the above matters, the display unit 62 with the antenna 21 provided thereon comprises the demultiplexing and multiplexing circuits 22, 27 and the active circuits 23a, 23b, and the main body 64 comprises the demultiplexing and multiplexing circuit 31 and the wireless systems 32, 33.

It is noted that when the number of wireless systems connected to the demultiplexing and multiplexing circuit 31 is increased, the same number of active circuits should be connected in parallel between the demultiplexing and multiplexing circuits 22, 27. The configuration of each demultiplexing and multiplexing circuit is same. Though there is explained that the present invention is applied to the notebook computer 60, it can be also applied to a foldable cellular phone, in which the upper and lower enclosures thereof may be connected relatively rotatably.

Next, there will be explained a function of the above-described portable information device. Here the frequency of signal is given as 2.4 GHz.

When the antenna 21 receives a signal with the frequency of 2.4 Ghz, the reception signal is output to the demultiplexing and multiplexing circuits 22. As the HPF 28b provided in the demultiplexing and multiplexing circuits 22 has the cutoff frequency of 3.1 GHz, the reception signal is not transferred. As the LPF 28a has the cutoff frequency of 2.5 GHz, the reception signal is transferred and output to the active circuit 23a.

The switches 24a, 25a of the active circuit 23a select and connect a reception path for outputting the reception signal through the amplifier 26a. The amplifier 26a amplifies the reception signal. The amplified reception signal is input to the demultiplexing and multiplexing circuit 27 and output to the cable 50 through a LPF of the demultiplexing and multiplexing circuit 27.

The amplified reception signal is output to the demultiplexing and multiplexing circuit 31 of the transmitting and receiving device 30a through the cable 50. The demultiplexing and multiplexing circuit 31 has the same structure with the demultiplexing and multiplexing circuits 22, 27 and performs a similar operation. The amplified reception signal is therefore transferred to a LPF of the demultiplexing and multiplexing circuit 31 and output to the wireless system 32.

When the wireless system 32 transmits a signal with the frequency of 2.4 Ghz, the transmission signal is input to the demultiplexing and multiplexing circuit 31 and output to the cable 50 through the LPF of the demultiplexing and multiplexing circuit 31.

The transmission signal is output through the cable 50 to the demultiplexing and multiplexing circuit 27 of the antenna device 20a. The demultiplexing and multiplexing circuit 27 performs a similar operation to those of the above other demultiplexing and multiplexing circuits. The transmission signal is therefore transferred to the LPF of the demultiplexing and multiplexing circuit 27 and output to the active circuit 23a. The HPF of the demultiplexing and multiplexing circuit 27 does not transfer the transmission signal.

The switches 24a, 25a of the active circuit 23a select and connect a transmission path for transferring and outputting the transmission signal without through the amplifier 26a. The transmission signal is input to the demultiplexing and multiplexing circuit 22 through the active circuit 23a and output to the antenna 21 through the LPF 28a of the demultiplexing and multiplexing circuit 22.

It is noted that in the present embodiment the active circuit 23a has the amplifier 26a only on the reception path, but may also have one on the transmission path. In this case, the output of the wireless system 32 can be suppressed since a signal is also amplified in the transmission path. The same is true for the active circuit 23b.

Though there is explained the case in which the frequency of a reception signal or a transmission signal has the frequency of 2.4 GHz (low frequency), the similar operation will be performed in the case of a signal of a high frequency such as 3.1 GHz. It is noted that a signal with a high frequency passes through the HPF of each demultiplexing and multiplexing circuit.

Also, the transmission or reception of a signal with a low frequency and the transmission or reception of a signal with a high frequency can be performed at the same time. That is, the wireless system 33 can freely transmit or receive a signal with a high frequency while the wireless system 32 is receiving a signal with a low frequency.

In the present embodiment, the wireless communication system 32 transmits or receives a signal with a low frequency band while the wireless communication system 33 transmits or receives a signal with a high frequency band, but the present invention is not limited to this case. As described in FIG. 4, a wireless system with WiMAX, UWB, or MBWA may be applicable with the use of a demultiplexing and multiplexing circuit provided with a plurality of BPFs, or a demultiplexing and multiplexing circuit provided with a combination of a LPF, HPF and BPF.

In the above-described portable information device of the present embodiment, the reduction of the CN ratio of a reception signal is prevented and the reception sensitivity is improved by the amplifiers 26a, 26b provided within the active circuits 23a, 23b. Further, the plurality of wireless systems 32, 33 can be used at the same time, since the demultiplexing and multiplexing circuit 22 demultiplexes reception signals into signals with predetermined frequency bands. Furthermore, only the single cable 50 is required to pass through the hinge portion 40 by providing the demultiplexing and multiplexing circuit 27 on the antenna device 20a and the demultiplexing and multiplexing circuit 31 on the transmitting and receiving device main body 30a. Accordingly, the influence by the movements of the hinge portion 40 can be reduced.

It is noted that the transmittable and receivable frequency band of the antenna 21 as a wideband antenna are not limited to 2.4-4.8 GHz. Any antenna may be acceptable as long as it can transmit and receive signals with a plurality of frequency bands, which correspond to a plurality of wireless systems. As an example of the wideband antenna, there is given: a broadband antenna that can transmit and receive all signals with the frequency bands of 2.4-4.8 GHz; or a multi band antenna that can transmit and receive only signals with the frequency bands of 2.4-2.5 GHz and 3.1-4.8 GHz which are used in wireless systems.

Figure 6:
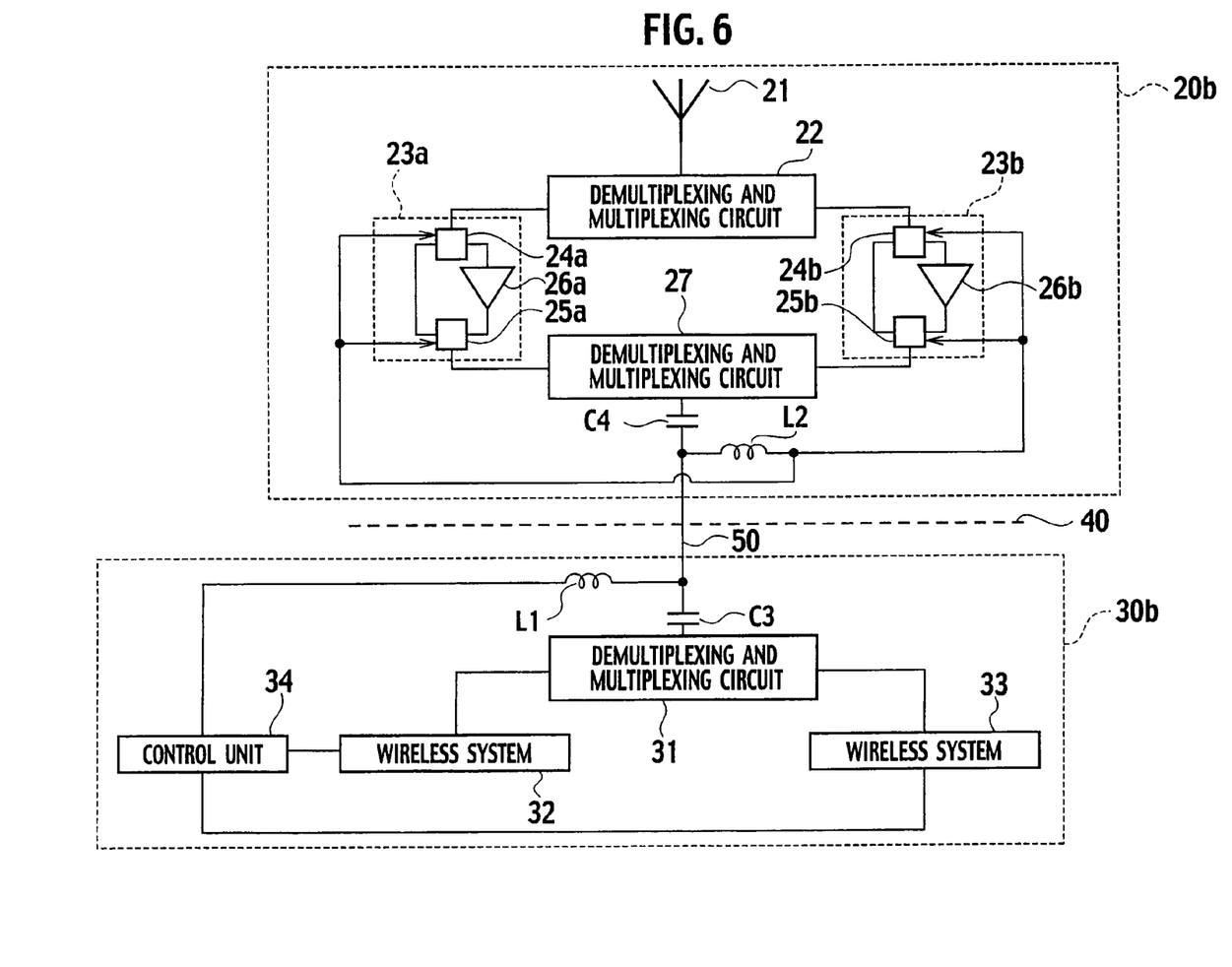
FIG. 6 shows a configuration of a portable information device according to an other embodiment of the present invention.

FIG. 6 shows a configuration of a portable information device according to an other embodiment of the present invention. The difference from the previous embodiment is that a portable information device according to the present embodiment comprises a control unit 34 in a transmitting and receiving device 30b. Same reference numbers are assigned to elements common to the previous embodiment.

The control unit 34 is connected to the wireless systems 32, 33, and the cable 50 through an inductance L1. The control unit 34 outputs a control signal to control the switches 24a, 25a of the active circuit 23a and the switches 24b, 25b of the active circuit 23b, in response to the presence or absence of transmission (output) signals or reception (input) signals in the respective wireless systems 32, 33.

The switches 24a, 25a and the switches 24b, 25b are connected to the cable 50 through an inductance L2 and select either a transmission path or reception path as a signal path based on a control signal output from the control unit 34.

In addition, the cable 50 is connected to the demultiplexing and multiplexing circuit 31 through a capacitor C3 and is connected to the demultiplexing and multiplexing circuit 27 through a capacitor C4. These capacitors C3, C4 are provided to cut off direct current control signals in the present embodiment, but may be provided in the previous embodiment to cut off noise components with low frequencies. The inductances L1, L2 are provided not to transfer alternate current components to each switch and the control unit 34.

In the present embodiment, the cable 50 is a coaxial cable which passes through the hinge portion 40 to connect demultiplexing and multiplexing circuits 27, 31 and transfers reception signals and transmission signals with a plurality of predetermined frequencies and control signals.

Next, there will be explained a function of the above-described portable information device. The control unit 34 monitors the operations of the wireless systems 32 and 33 and determines the transmission or reception of signals in each wireless system. It is also possible that each wireless system itself determines either the transmission or reception of signals, and output an information signal including the content of the determination to the control unit 34.

The control unit 34 outputs a control signal in response to the content of the determination. Since the present embodiment has two wireless systems 32, 33, the combination number of operation patterns of the wireless systems 32, 33 is four: the first pattern is that both of the wireless systems 32 and 33 receive signals; the second is that both of the wireless systems 32 and 33 transmit signals; the third is that the wireless system 32 receives signals and the wireless system 33 transmits signals; and the fourth is that the wireless system 32 transmits signals and the wireless system 33 receives signals. The control unit 34 therefore has to output only four kinds of control signals. It is noted that when there are three wireless systems, eight kinds of control signals are required as the combination number of operation patterns of the wireless systems is eight.

It is possible that four kinds of control signals are realized by the combination patterns of ON and OFF. In the present embodiment, however, control signals are set with voltage thresholds. For example, a control signal less than −5V corresponds to the first pattern, a control signal greater than or equal to −5V and less than −2V corresponds to the second pattern, a control signal greater than or equal to −2V and less than +2V corresponds to the third pattern, and a control signal greater than or equal to +2V corresponds to the second pattern. For example, when both of the wireless systems 32, 33 transmit signals, the control unit 34 outputs a control signal greater than or equal to −5V and less than −2V (for example, −3V) which corresponds to the second pattern. When the wireless system 32 transmits signals and the wireless system 33 receives signals, the control unit 34 outputs a control signal greater than or equal to +2V (for example, +3V) which corresponds to the fourth pattern.

An output control signal controls each switch of the wireless systems 32, 33 through the inductance L1, the cable 50 and the inductance L2. For example, when a control signal with −3V for the second pattern is output, both of the switches 24a, 25a and the switches 24b, 25b select the transmission path. When a control signal with +3V for the fourth pattern is output, the switches 24a, 25a select the transmission path and the switches 24b, 25b select the reception path.

Since other operations of the above portable information device are similar to them of the first embodiment, the detailed explanations of them are omitted.

As described above, a portable information device of this embodiment quickly and accurately control the switches 24a, 25a of the active circuit 23a and the switches 24a, 25a of the active circuit 23b in response to independent transmission-reception operations of the respective wireless systems 32, 33, in addition to the effects of the first embodiment.

It is also possible to reduce the burden to the hinge portion 40 since a control signal is also transferred through the cable 50 which transfers transmission and reception signals.

The present invention can be applied to a portable information device, such as a notebook computer or a cellular phone, that has a hinge portion which combines a first enclosure including an antenna and the second enclosure including a transmitting and receiving circuit.

According to the present invention, it is possible to mount a multi wireless system that can realize a wireless communication with a high CN ratio on a small information device suitable for carrying.

This application is based upon the Japanese Patent Applications No. 2007-007097, filed on Jan. 16, 2007, the entire content of which is incorporated by reference herein.

What is claimed is:

1. A portable information device comprising:
a first enclosure including:
an antenna that receives and transmits signals;
a first demulitiplexing and multiplexing circuit connected to the antenna;
a plurality of active circuits connected in parallel to the first demultiplexing and multiplexing circuit, the plurality of active circuits processing the signals with a plurality of predetermined frequency bands respectively; and
a second demultiplexing and multiplexing circuit connected to the plurality of active circuits in common;
a second enclosure including:
a third demultiplexing and multiplexing circuit connected to the second demultiplexing and multiplexing circuit; and
a plurality of wireless communication control units connected in parallel to the third demultiplexing and multiplexing circuit, the plurality of wireless communication control units processing signals with the respective predetermine frequency bands; and
a connection portion that connects the first enclosure with the second enclosure,
wherein the first demultiplexing and multiplexing circuit is configured to demuliplex reception signals from the antenna into input signals with respect to each predetermined frequency band, thereby outputting the input signals to the plurality of active circuits, and multiplex output signals with the plurality of predetermined frequency bands from the active circuits, and thereby outputting the multiplexed output signals as transmission signals to the antenna,
wherein each of the active circuits includes an amplifier that amplifies the input signals; and a switch that selects either a reception line that outputs the input signals to the second demultiplexing and multiplexing circuit through the amplifier or a transmission line that outputs output signals from the second demultiplexing and multiplexing circuit to the antenna,
wherein the second demultiplexing and multiplexing circuit is configured to multiplex the input signals from the active circuits, thereby outputting the multiplex input signals as the reception signals to the third demultiplexing and multiplexing circuit, and demultiplex signals from the third demultiplexing and multiplexing circuit as the transmission signals into the respective frequency bands, and thereby outputting the multipexed signals as the output signals to the active circuits,
wherein the third demultiplexing and multiplexing circuit is configured to demultiplex the reception signals from the second demultiplexing and multiplexing circuit into input signals with respect to each predetermined frequency band, thereby outputting the input signals to the wireless communication control units, and multiplex output signals from the wireless communication control units, and thereby outputting the multiplexed output signals as the transmission signals to the second demultiplexing and multiplexing circuit, and
wherein each of the wireless communication control units is configured to perform at least one of modulation and demodulation of the respective input signals and the respective output signals using a carrier wave with the each predetermined frequency band.

2. The portable information device of claim 1, wherein the second and third circuits are electrically connected by a coaxial cable that passes through the connection portion and transfers the reception signals and the transmission signals.

3. The portable information device of claim 1, wherein the second enclosure further comprises a central processing unit that computes data to generate image data, and the first enclosure further comprises a display unit that displays images based on the image data.

4. The portable information device of claim 1, wherein the second enclosure further comprises a control unit that outputs a control signal to control each switch of the plurality of active circuits in response to presence or absence of input signals or output signals in each of the plurality of wireless communication control units, wherein each switch selects either the transmission line or the reception line based on the control signal output from the control unit.

5. The portable information device of claim 4, wherein the second and third circuits are electrically connected by a coaxial cable that passes through the connection portion and transfers the reception signals, the transmission signals and the control signal.

6. The portable information device of claim 1, wherein a signal inputted into each of the first, second, and third demultiplexing and muliplexing circuits is transmitted through only a path for the frequency of the signal.

* * * * *